United States Patent
Kang et al.

(10) Patent No.: US 10,797,539 B2
(45) Date of Patent: Oct. 6, 2020

(54) FAN ROTOR

(71) Applicant: DELTA ELECTRONICS, INC., Taoyuan County (TW)

(72) Inventors: Chao-Hsing Kang, Taoyuan County (TW); Chien-Ho Lee, Taoyuan County (TW); Tsung-Yin Lee, Taoyuan County (TW)

(73) Assignee: DELTA ELECTRONICS, INC., Guishan Township (TW)

( * ) Notice: Subject to any disclaimer, the term of this patent is extended or adjusted under 35 U.S.C. 154(b) by 177 days.

(21) Appl. No.: 15/927,024

(22) Filed: Mar. 20, 2018

(65) Prior Publication Data

US 2018/0212479 A1     Jul. 26, 2018

Related U.S. Application Data

(63) Continuation of application No. 14/719,808, filed on May 22, 2015, now abandoned.
(Continued)

(51) Int. Cl.
   *F04D 19/00*     (2006.01)
   *F04D 25/06*     (2006.01)
   (Continued)

(52) U.S. Cl.
   CPC ............... *H02K 1/16* (2013.01); *F04D 17/08* (2013.01); *F04D 19/002* (2013.01);
   (Continued)

(58) Field of Classification Search
   CPC .... F04D 17/08; F04D 19/002; F04D 25/0613; F04D 25/08; F04D 25/088; F04D 29/053;
   (Continued)

(56) References Cited

U.S. PATENT DOCUMENTS

| | | |
|---|---|---|
| 4,505,031 A | 3/1985 | Colwell et al. |
| 5,873,701 A | 2/1999 | Shiu |
| 6,379,116 B1 | 4/2002 | Tai |

FOREIGN PATENT DOCUMENTS

| | | |
|---|---|---|
| CN | 201318324 | 9/2009 |
| CN | 102536895 | 7/2012 |

OTHER PUBLICATIONS

Machine Translation of CN102536895 [retrieved on Jan. 30, 2020]. Retrieved from: Espacenet. (Year: 2020).*

(Continued)

*Primary Examiner* — Ninh H. Nguyen
*Assistant Examiner* — Eric J Zamora Alvarez
(74) *Attorney, Agent, or Firm* — Hauptman Ham, LLP

(57) ABSTRACT

A fan rotor includes a rotating shaft, a metal body, at least one rotor magnet and a vane wheel. The metal body has at least one top surface, at least one cylindrical portion and at least one connecting portion. The top surface is disposed at an end of the cylindrical portion, and the rotating shaft is disposed in the cylindrical portion and connected to the top surface of the cylindrical portion. The connecting portion is formed at the other end of the cylindrical portion and extended from an outer wall of the opening in a direction away from the rotating shaft. The rotor magnet is disposed around an inner wall surface of the cylindrical portion. The vane wheel is detachably connected to the metal body through the connecting portion.

9 Claims, 17 Drawing Sheets

Related U.S. Application Data

(60) Provisional application No. 62/001,898, filed on May 22, 2014.

(51) Int. Cl.
    *F04D 29/32*    (2006.01)
    *F04D 29/64*    (2006.01)
    *F04D 17/08*    (2006.01)
    *F04D 29/053*   (2006.01)
    *F04D 29/28*    (2006.01)
    *H02K 1/16*     (2006.01)
    *H02K 9/06*     (2006.01)
    *H02K 1/27*     (2006.01)
    *H02K 7/14*     (2006.01)
    *H02K 1/30*     (2006.01)
    *H02K 5/10*     (2006.01)
    *H02K 5/22*     (2006.01)

(52) U.S. Cl.
    CPC ....... *F04D 25/0613* (2013.01); *F04D 29/053* (2013.01); *F04D 29/281* (2013.01); *F04D 29/325* (2013.01); *F04D 29/329* (2013.01); *F04D 29/646* (2013.01); *H02K 1/2786* (2013.01); *H02K 1/30* (2013.01); *H02K 5/10* (2013.01); *H02K 5/225* (2013.01); *H02K 7/14* (2013.01); *H02K 9/06* (2013.01)

(58) Field of Classification Search
    CPC .... F04D 29/281; F04D 29/325; F04D 29/329; F04D 29/34; F04D 29/38; F04D 29/388; F04D 29/646
    See application file for complete search history.

(56) References Cited

OTHER PUBLICATIONS

Office Action dated Feb. 6, 2017 from corresponding application No. CN 201510262463.x.
Office Action dated Jul. 21, 2017 from corresponding application No. CN 201510262463.x.

* cited by examiner

US 10,797,539 B2

FAN ROTOR

FIELD OF THE INVENTION

The technical field relates to a fan, and more particularly to a fan rotor. In addition, this disclosure claims U.S. Provisional Patent Application No. 62/001,898 as its parent application and May 22, 2014 as its priority date.

BACKGROUND OF THE INVENTION

This disclosure is directed to a fan rotor of a large fan, whose structure generally includes a metal cap shell and a vane wheel, and the metal cap shell has a permanent magnet and a rotating shaft installed therein, and the vane wheel is connected to the metal cap shell fan rotor and pivoted to a stator seat by a rotating shaft for rotating the rotating shaft with respect to the stator seat. In general, the metal cap shell is a part of the fan motor, so that the manufacture requires different motors corresponsive to different models of vane wheels, and the rotor cannot be used universally for different types of vane wheels. Obviously, the conventional fan rotor is not cost-effective.

In view of the aforementioned problems of the prior art, the inventor of this disclosure based on years of experience in the industry to conduct extensive researches and experiments and finally invented a novel fan rotor to overcome the problem of the prior art.

SUMMARY OF THE INVENTION

Therefore, it is a primary objective of this disclosure to provide a universal fan rotor that can be installed, removed, or replaced for various types of vane wheels.

To achieve the aforementioned and other objectives, this disclosure provides a fan rotor comprising a rotating shaft, a metal body, at least one rotor magnet and a vane wheel. The metal body has at least one top surface, at least one cylindrical portion and at least one connecting portion, and the top surface disposed at an end of the cylindrical portion, and the rotating shaft is disposed in the cylindrical portion and connected to the top surface of the rotating shaft, and an opening, connecting portion is formed at the other end of the cylindrical portion and extended radially from the outer wall of the opening towards a direction away from the rotating shaft. The rotor magnet is disposed around an inner wall surface of the cylindrical portion. The vane wheel is detachably connected to the metal body through the connecting portion.

The fan rotor of this disclosure may have different types of vane wheels installed at the metal body depending on actual using requirements, so that the fan rotor of this disclosure is applicable for different using requirements.

DESCRIPTION OF THE PREFERRED EMBODIMENTS

The technical contents of this disclosure will become apparent with the detailed description of preferred embodiments accompanied with the illustration of related drawings as follows.

Figure 1:
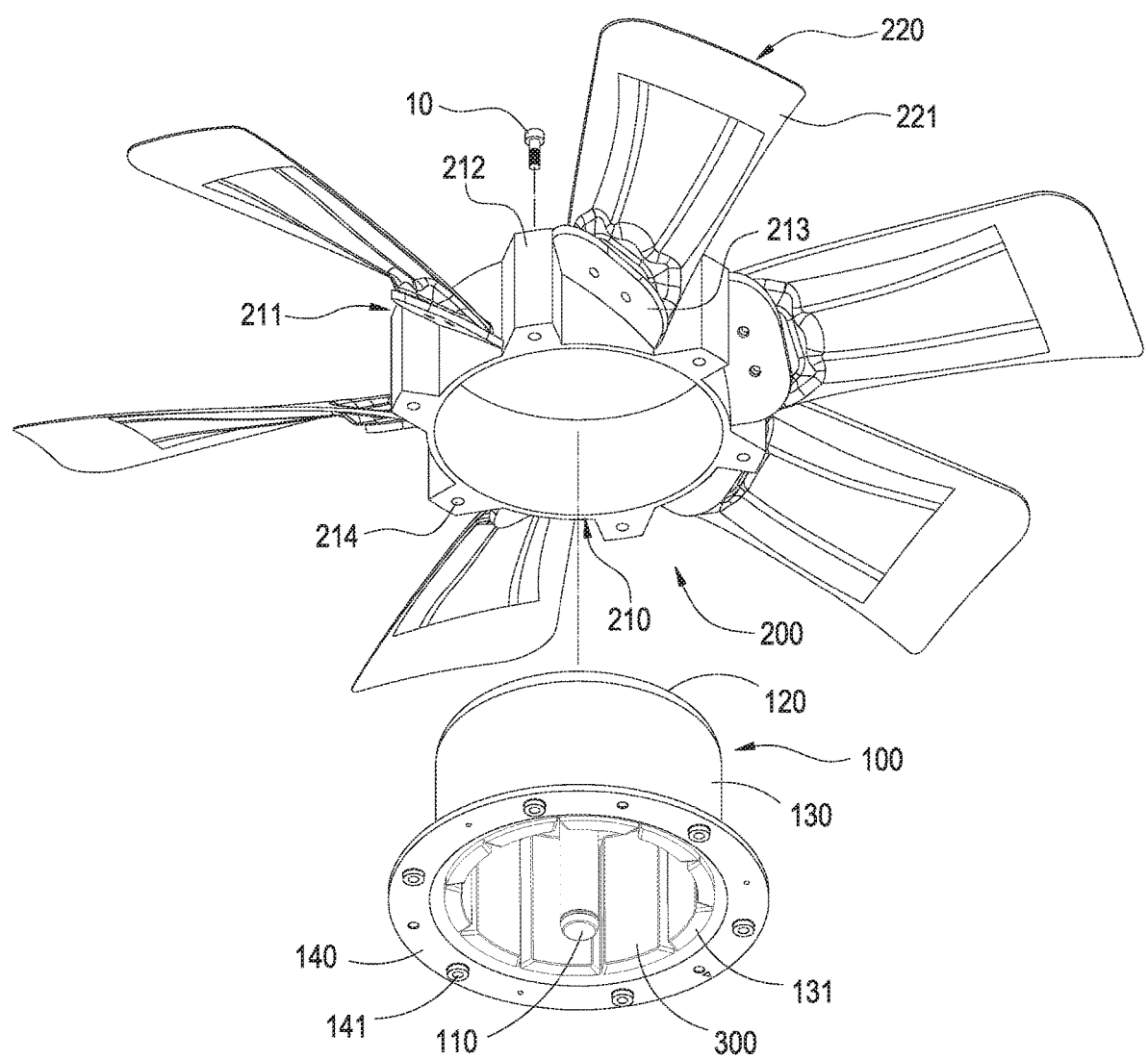
FIG. 1 is an exploded view of a first exemplary embodiment of a fan rotor of this disclosure.
Figure 2:
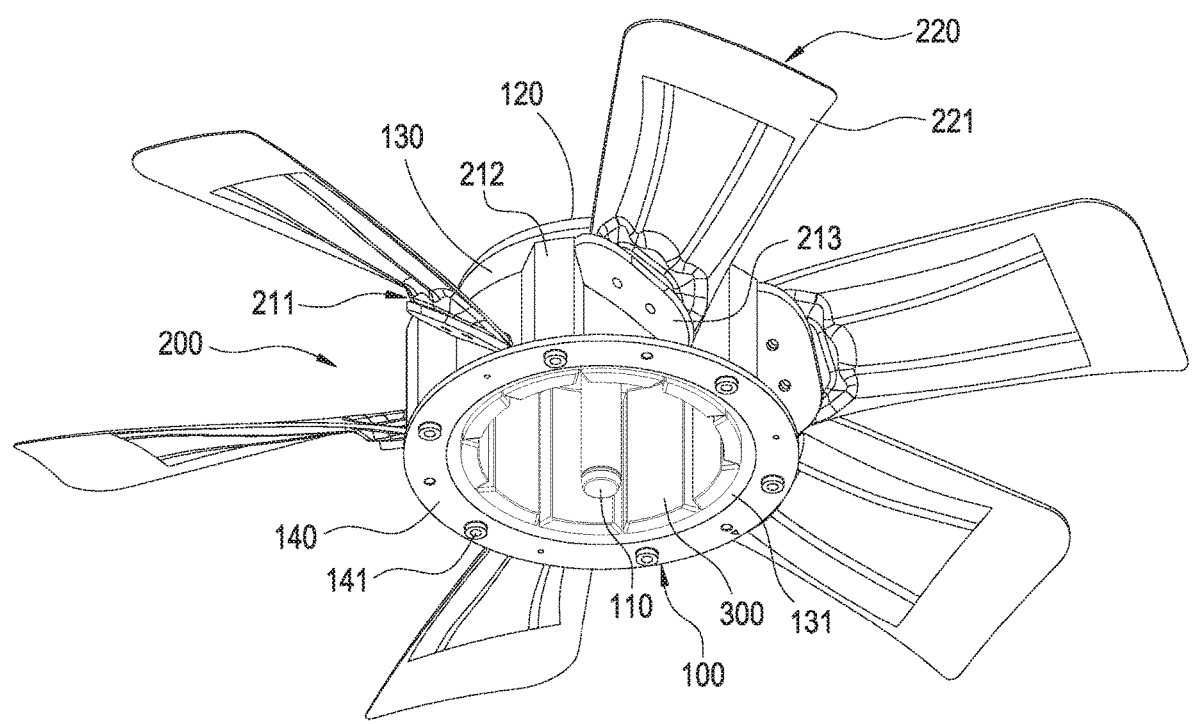
FIG. 2 is a perspective view of the first exemplary embodiment of a fan rotor of this disclosure.
Figure 3:
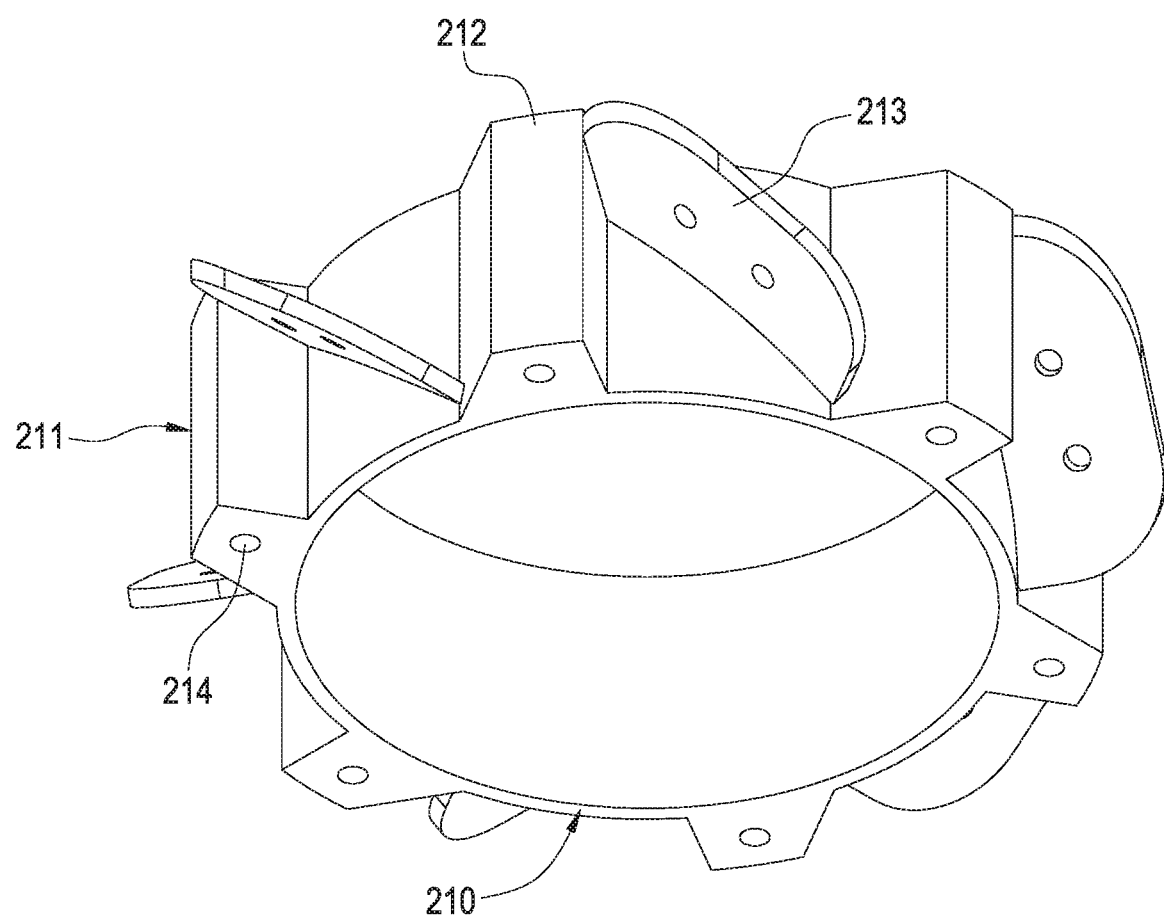
FIG. 3 is a perspective view of a connecting structure of the first exemplary embodiment of a fan rotor of this disclosure.

With reference to FIGS. 1 to 3 for the first exemplary embodiment of a fan rotor of this disclosure, the fan rotor comprises a metal body 100, a vane wheel 200 and at least one rotor magnet 300.

The metal body 100 includes a rotating shaft 110, at least one top surface 120, at least one cylindrical portion 130 and at least one connecting portion 140. The rotating shaft 110 is installed axially in the cylindrical portion 130. The rotor magnet 300 is disposed around an inner surface of the cylindrical portion. The top surface 120 is disposed at an end of the cylindrical portion 130. The rotating shaft 110 is connected to the top surface 120. An opening 131 is formed at the other end of the cylindrical portion 130. The connecting portion 140 is extended from an outer wall of the opening 131 of the cylindrical portion 130 in a direction away from the rotating shaft 110. The connecting portion 140 preferably has a plurality of first locking holes 141 arranged around the connecting portion 140.

The vane wheel 200 includes a connecting structure 210 and a vane unit 220, and the connecting structure 210 is sheathed on the metal body 100 and locked to the connecting portion 140, and the vane unit 220 is locked to the connecting structure 210. Therefore, the vane wheel 200 is detachably connected to the metal body 100 through the connecting portion 140. Wherein, the vane unit 220 is an axial flow type blade, a plate type blade, or a centrifugal blade.

In this exemplary embodiment, the connecting structure 210 has a plurality of connecting units 211 formed on and protruded from an outer side of the connecting structure 210, and each connecting unit 211 includes a connecting pillar 212 extended in a direction parallel to the axis of the connecting structure 210, and each connecting pillar 212 preferably has a blade carrying portion 213 extended from an end or an edge of each respective connecting pillar 212, and the blade carrying portion 213 is inclined with respect to the connecting pillar 212 to define an included angle which is not equal to 0 degree or 180 degrees. The other end of each connecting pillar 212 is locked to the connecting portion 140. The connecting pillars 212 are configured to be corresponsive to the first locking holes 141 respectively, and each connecting pillar 212 has a second locking hole 214 formed thereon, and the second locking hole 214 formed on each connecting pillar 212 penetrates through both ends of the connecting pillar 212 along the longitudinal direction of the connecting pillar 212.

In this exemplary embodiment, the vane unit 220 includes a plurality of axial flow type blades 221, and each axial flow type blade 221 is locked to the blade carrying portion 213 of the corresponsive connecting pillar 212 and arranged substantially in a radial shape, and each axial flow type blade 221 is inclined with respect to the connecting structure 210. The fan rotor is pivoted to a stator seat (not shown in the figure) through the rotating shaft 110 and rotatable with respect to the stator seat, so that the axial flow type blade 221 can rotate with respect to the rotating shaft 110.

Figure 4:
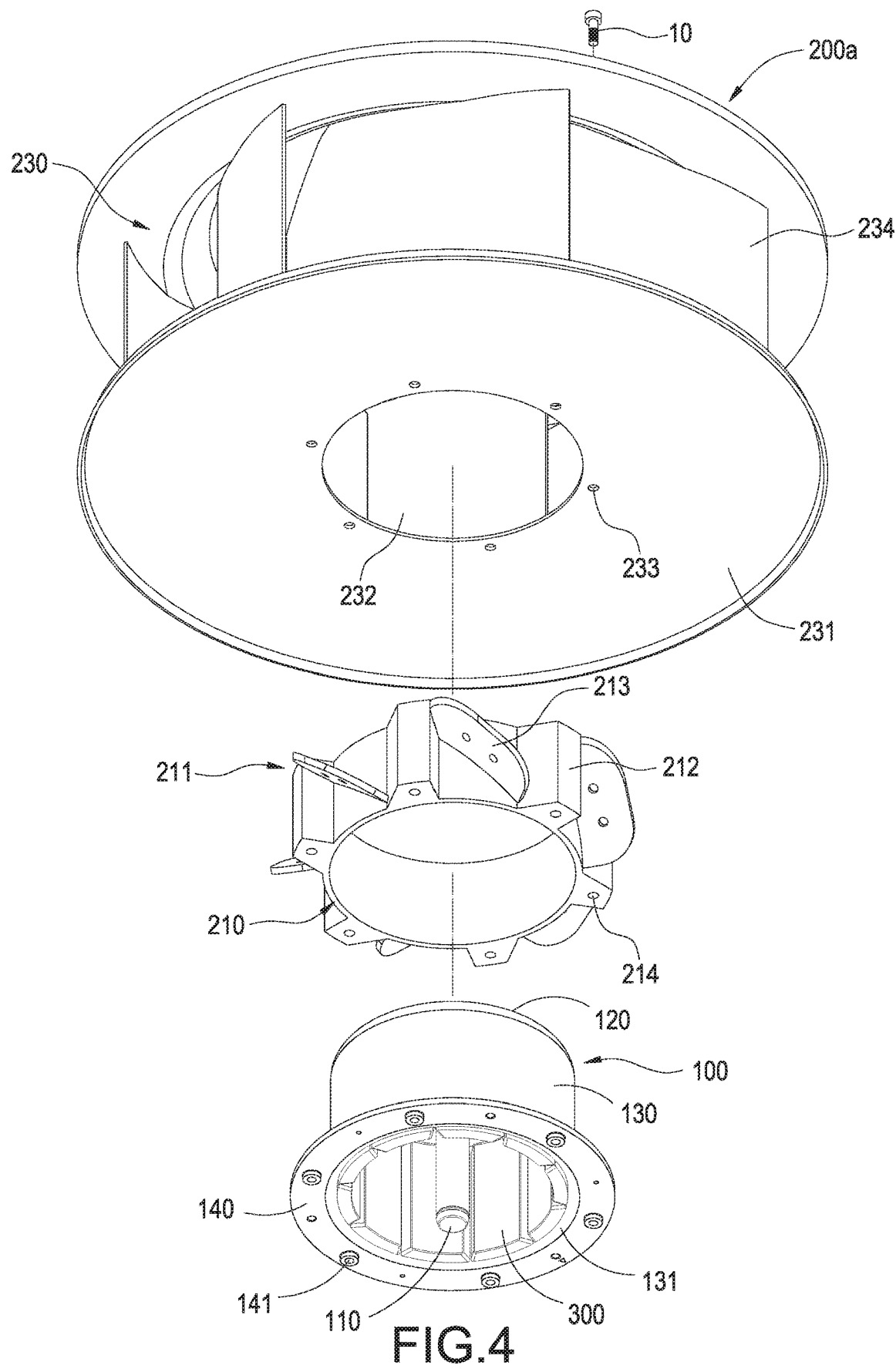
FIG. 4 is an exploded view of a second exemplary embodiment of a fan rotor of this disclosure.
Figure 5:
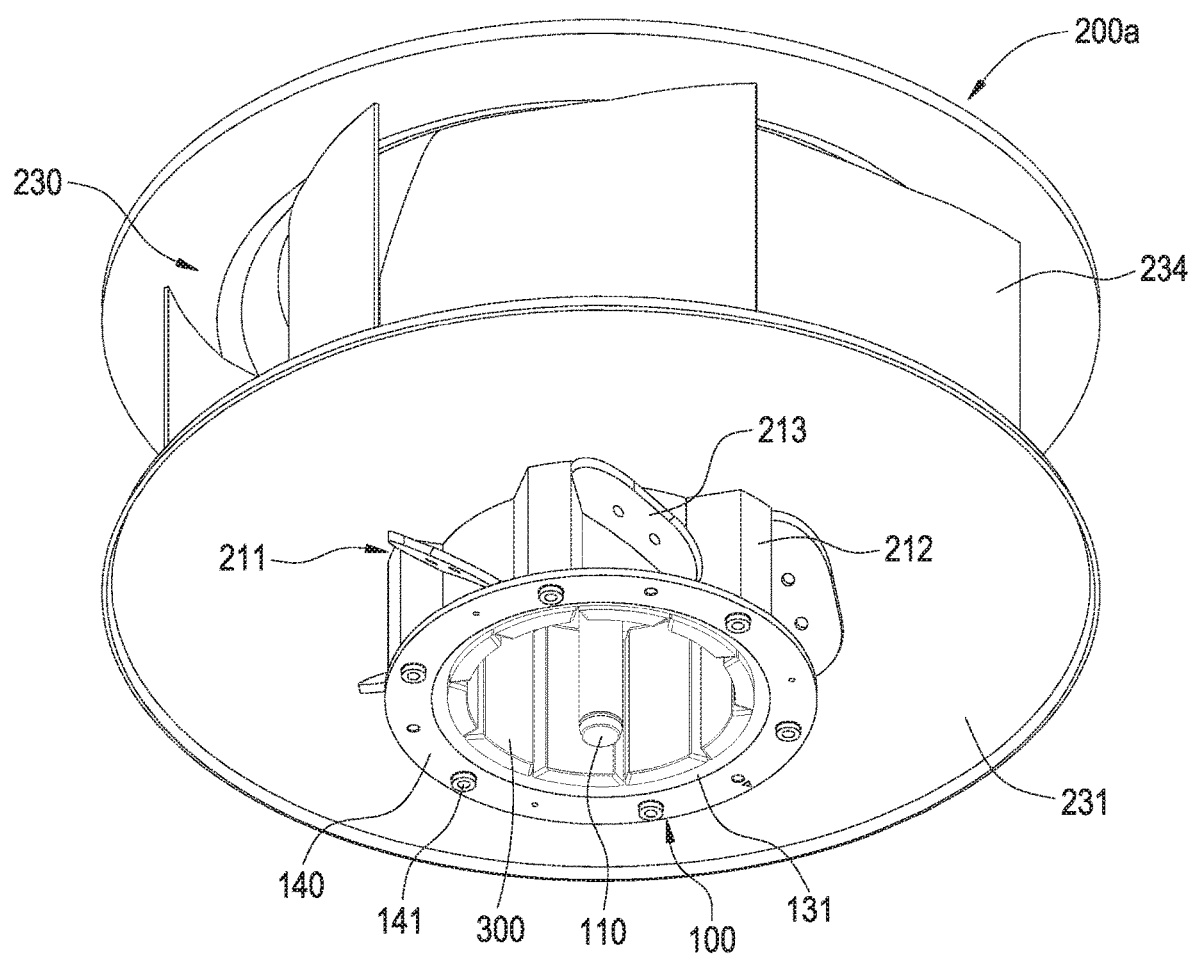
FIG. 5 is a perspective view of the second exemplary embodiment of a fan rotor of this disclosure.
Figure 6:
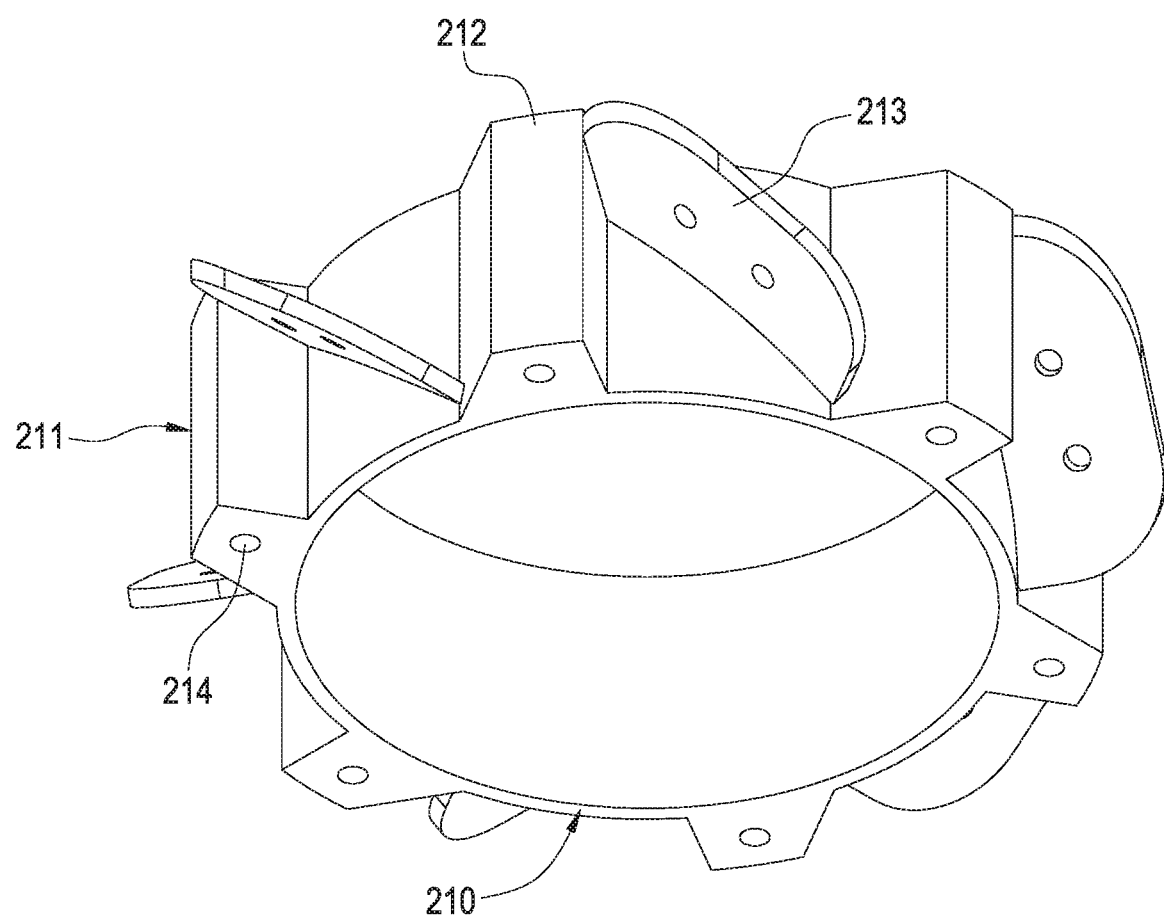
FIG. 6 is a perspective view of a connecting structure of the second exemplary embodiment of a fan rotor of this disclosure.

With reference to FIGS. 4 to 6 for the second exemplary embodiment of a fan rotor of this disclosure, the fan rotor comprises a metal body 100 and a vane wheel 200a. The structure of the metal body 100 of this exemplary embodiment is the same as that of the first exemplary embodiment and thus will not be repeated.

The vane wheel 200a includes a connecting structure 210 and a vane unit 230, and the structure of the connecting structure 210 is the same as that of the first exemplary embodiment, and thus will not be repeated. The connecting structure 210 is sheathed on the metal body 100 and locked to the connecting portion 140. If the length of the connecting structure is shorter than the metal body, the connecting structure will surround a portion of the lateral side of the metal body only. The vane unit 230 is preferably locked to the connecting structure 210.

In this exemplary embodiment, the vane unit 230 includes a chassis 231, a socket 232 formed on the chassis 231, and a plurality of third locking holes 233 formed on the chassis 231 and corresponsive to the second locking holes 214 respectively and arranged around the socket 232. The chassis 231 includes a plurality of centrifugal blades 234 disposed around the socket 232 substantially in a radial shape.

The vane wheel 200a is sheathed on the metal body 100 through the socket 232, so that the centrifugal blades 234 are arranged round the metal body 100. An end of the second locking hole 214 is locked to the corresponsive first locking hole 141 formed on the connecting portion 140 by a screw 10, and the other end of the second locking hole 214 is locked to the corresponsive third locking hole 233 by a screw 10, so that the vane wheel 200a is locked to the connecting portion 140. The fan rotor is pivoted to a stator seat (not shown in the figure) by the rotating shaft 110 and rotatable with respect to the stator seat, so that the centrifugal blades 234 can rotate with respect to the rotating shaft 110.

Figure 7:
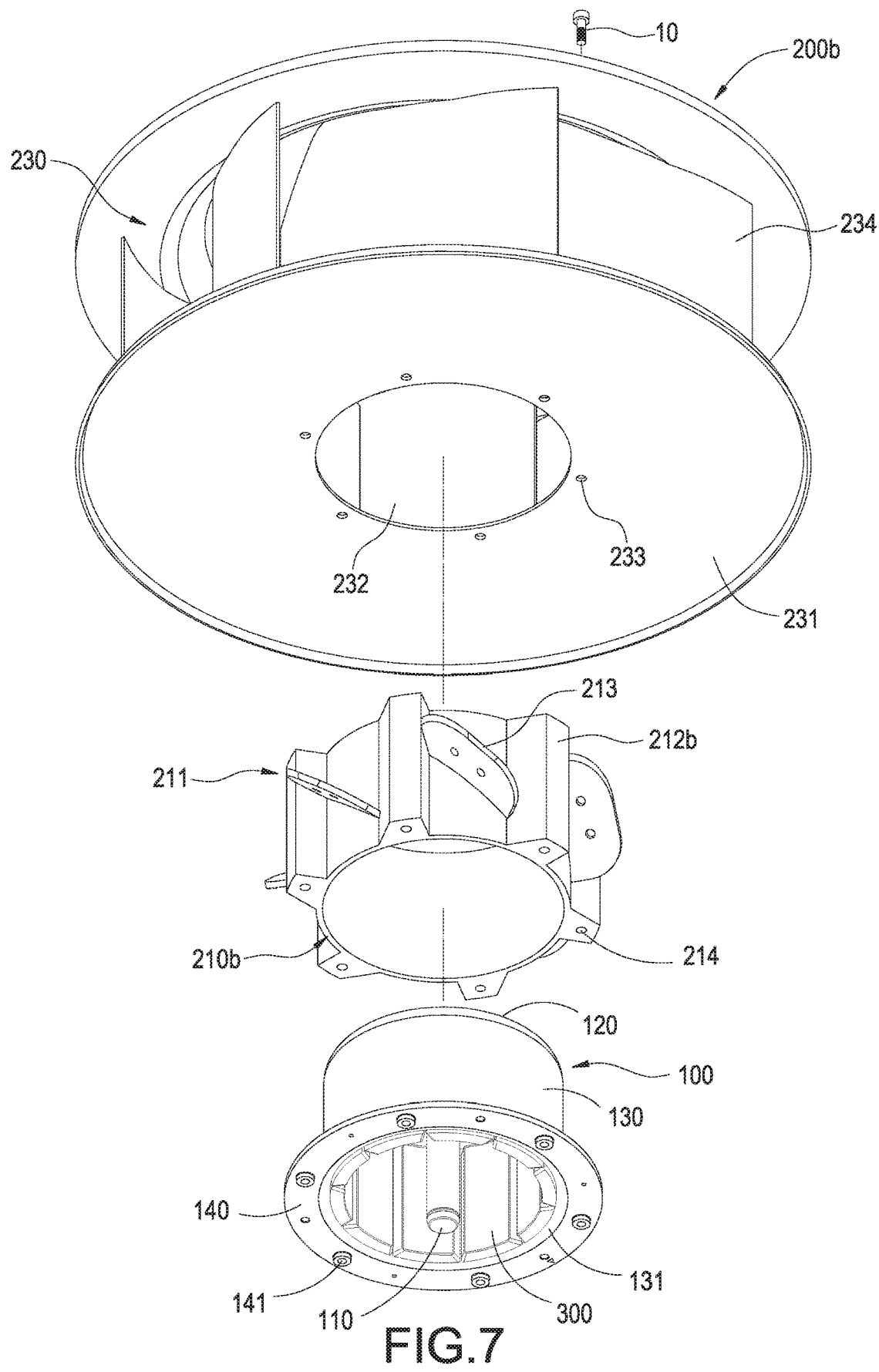
FIG. 7 is an exploded view of a third exemplary embodiment of a fan rotor of this disclosure.
Figure 8:
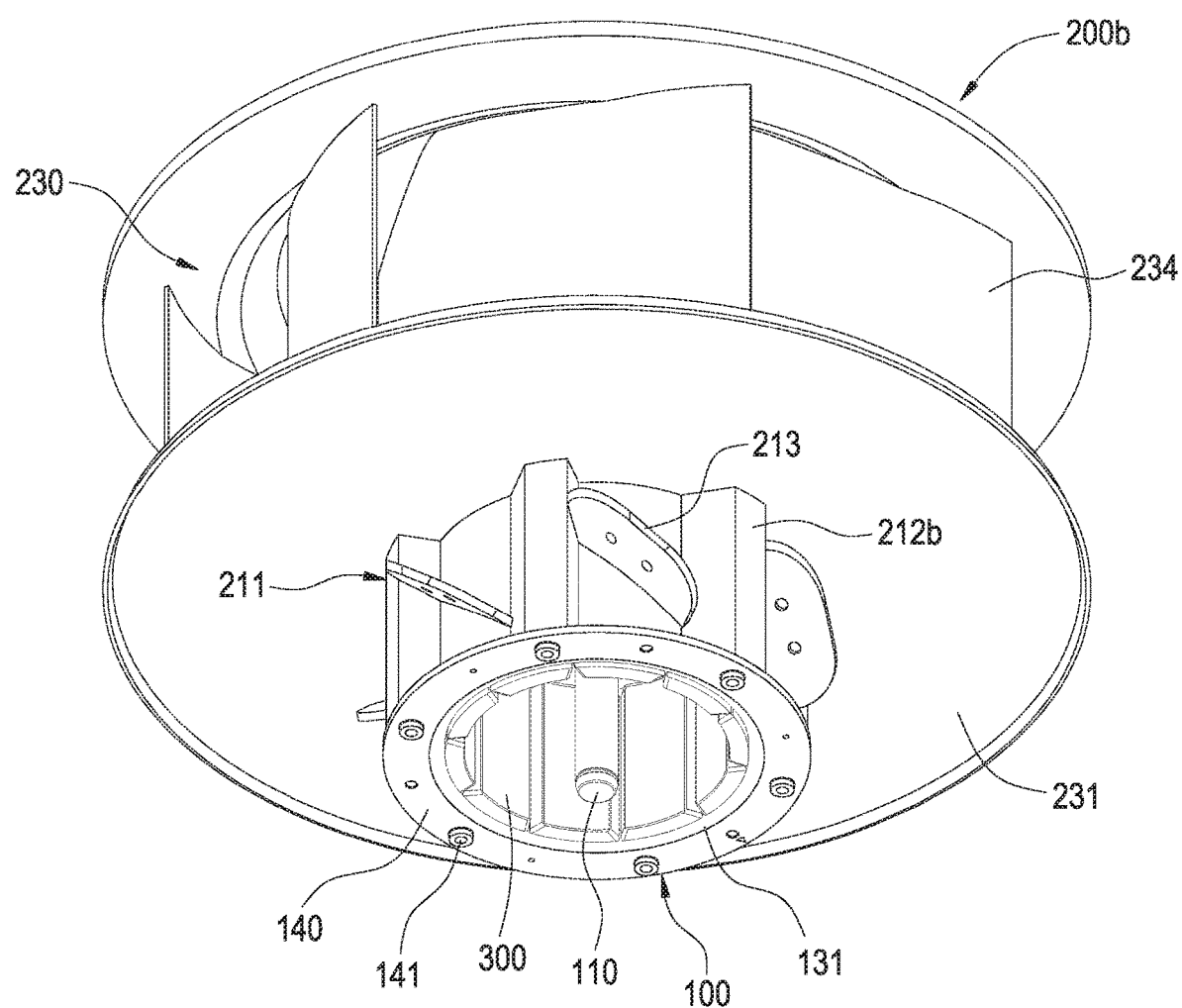
FIG. 8 is a perspective view of the third exemplary embodiment of a fan rotor of this disclosure.
Figure 9:
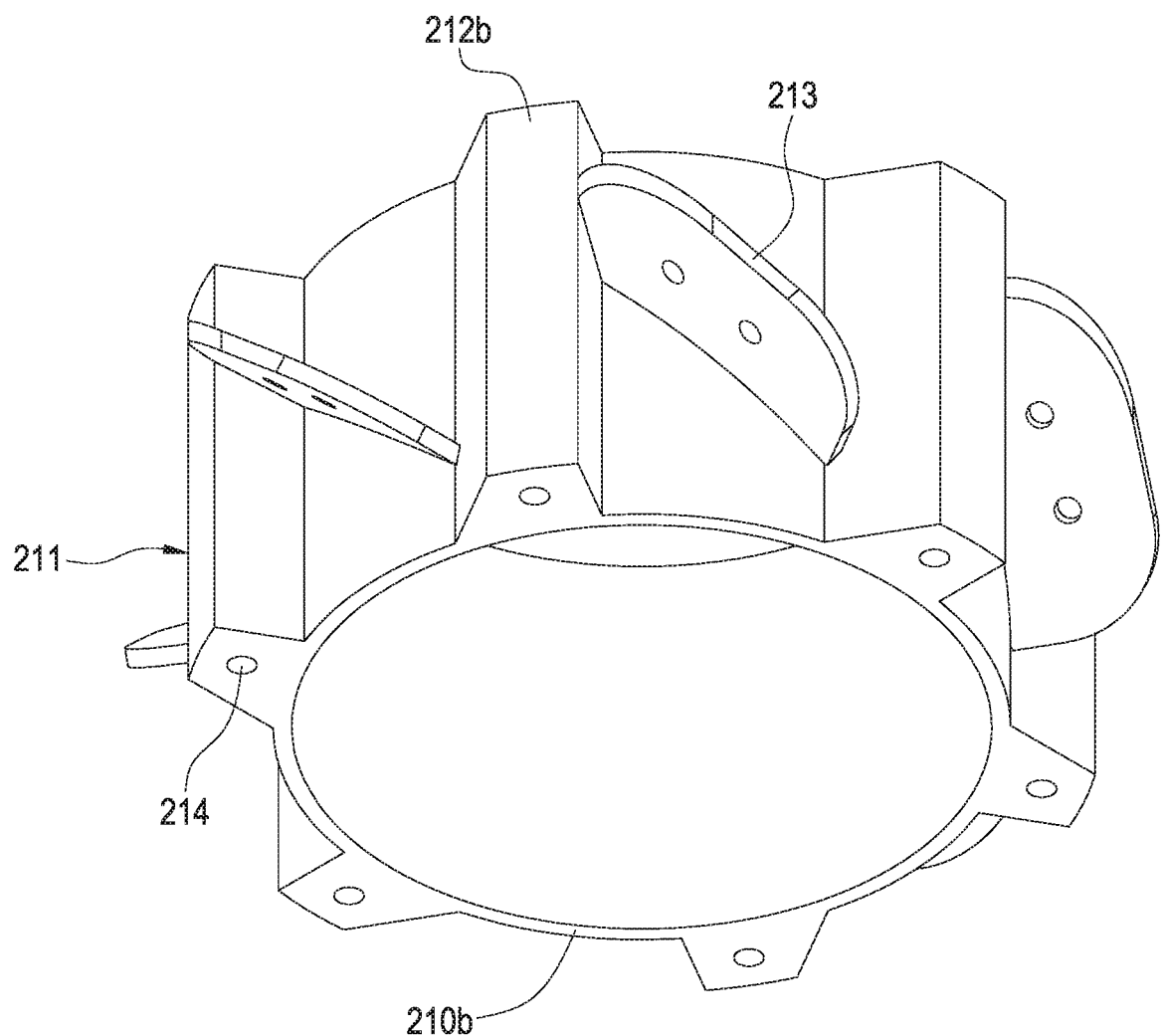
FIG. 9 is a perspective view of a connecting structure of the third exemplary embodiment of a fan rotor of this disclosure.

With reference to FIGS. 7 to 9 for the third exemplary embodiment of a fan rotor of this disclosure, the fan rotor comprises a metal body 100 and a vane wheel 200b. The structure of the metal body 100 of this exemplary embodiment is the same as that of the first exemplary embodiment and thus will not be repeated.

The vane wheel 200b includes a connecting structure 210b and a vane unit 230, and the structure of the connecting structure 210b is substantially the same as that of the first exemplary embodiment, except that the length of the connecting structure 210b and the connecting pillar 212b is substantially equal to the length of the metal body 100, so that when the connecting structure 210b is sheathed on the metal body 100, the connecting structure completely surrounds the lateral side of the metal body and higher than the top surface 120 of the metal body 100. The connecting structure 210b is locked to the connecting portion 140, and the vane unit 230 is locked to the connecting structure 210b.

In this exemplary embodiment, the vane unit 230 includes a chassis 231, and a plurality of third locking holes 233 formed on the chassis 231, configured to be corresponsive to the second locking holes 214 respectively, and arranged substantially in a circular shape. The chassis 231 has a plurality of centrifugal blades 234 installed thereon and arranged substantially in a radial shape.

An end of the second locking hole 214 is locked to the corresponsive first locking hole 141 of the connecting portion 140 by a screw 10, and the other end of the second locking hole 214 is locked to the corresponsive third locking hole 233 by a screw 10, so that the vane wheel 200b is clocked to the connecting portion 140, and the extending line of the rotating shaft 110 passes through the radiating center of the centrifugal blade 234. The fan rotor is pivoted to a stator seat (not shown in the figure) through the rotating shaft 110 and rotatable with respect to the stator seat, so that the centrifugal blade 234 can rotate with respect to the rotating shaft 110.

In this exemplary embodiment, a blade carrying portion 213 is extended from a side of each connecting pillar 212b and inclined with respect to the connecting pillar 212b with an inclined angle not equal to 0 degree or 180 degrees, and each blade carrying portion 213 is provided for being selectively locked to the axial flow type blade 221 of the vane unit 220 as described in the first exemplary embodiment. If the axial flow type blade 221 is selected and locked, then the vane unit 220 having the centrifugal blade 234 will be removed or replaced.

Figure 10:
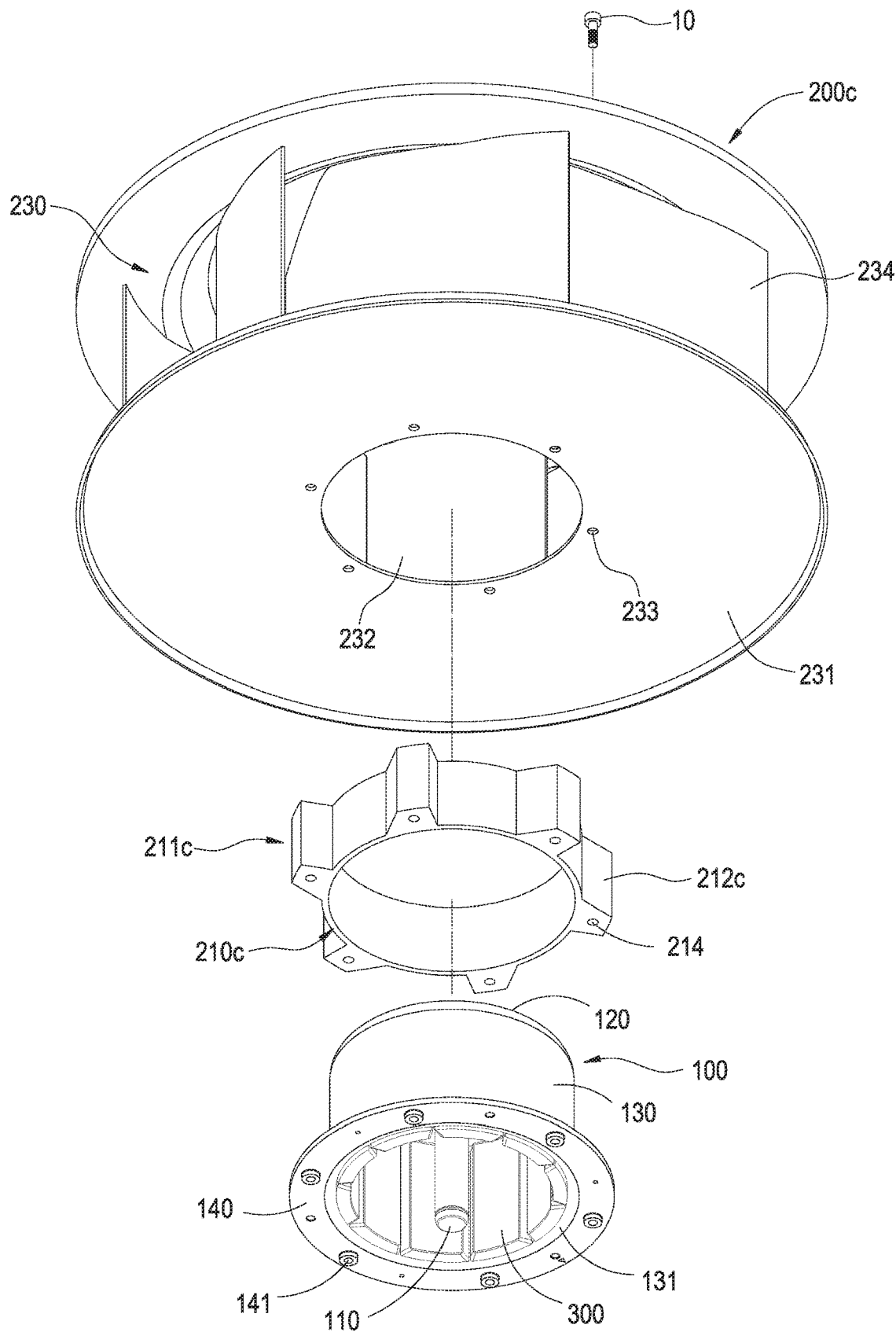
FIG. 10 is an exploded view of a fourth exemplary embodiment of a fan rotor of this disclosure.
Figure 11:
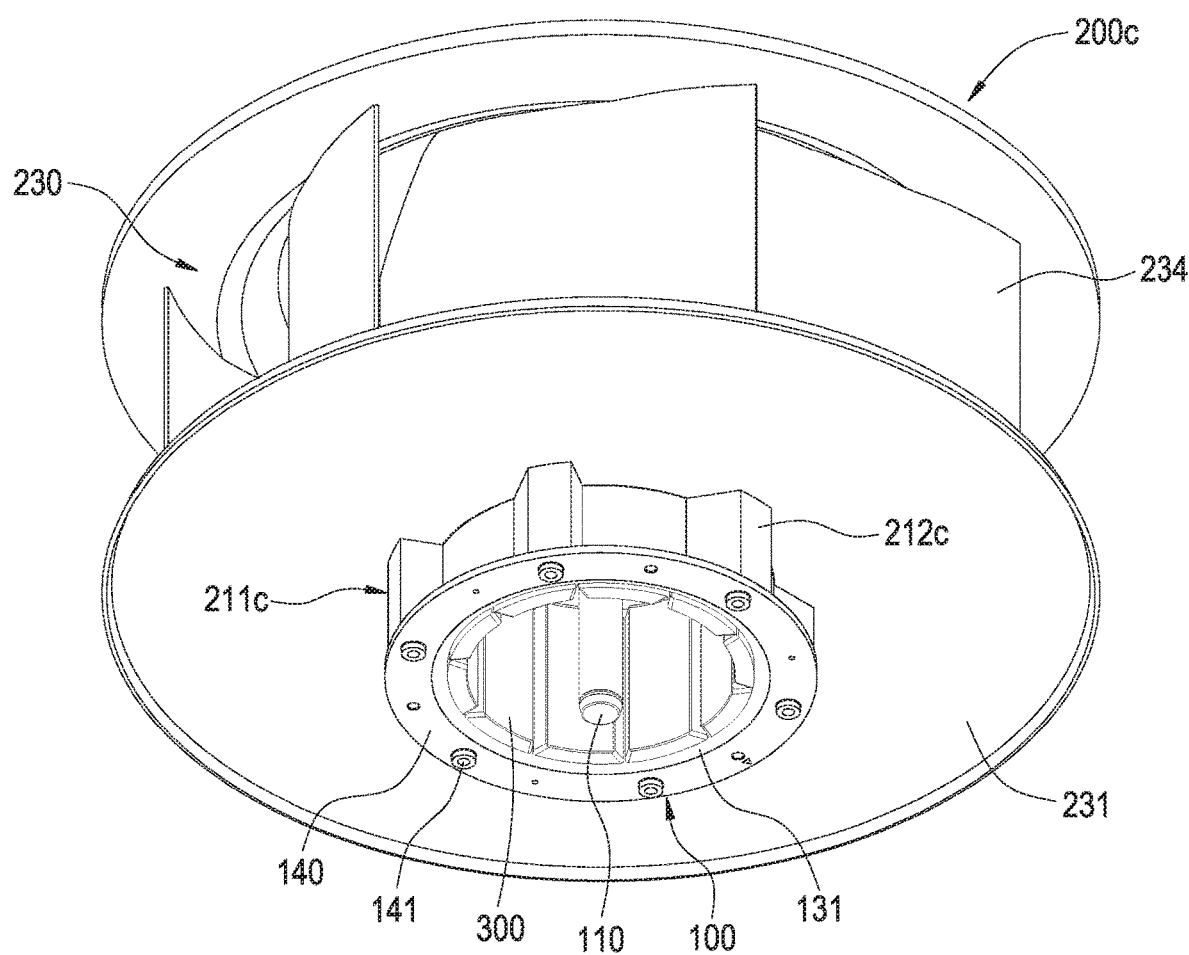
FIG. 11 is a perspective view of the fourth exemplary embodiment of a fan rotor of this disclosure.
Figure 12:
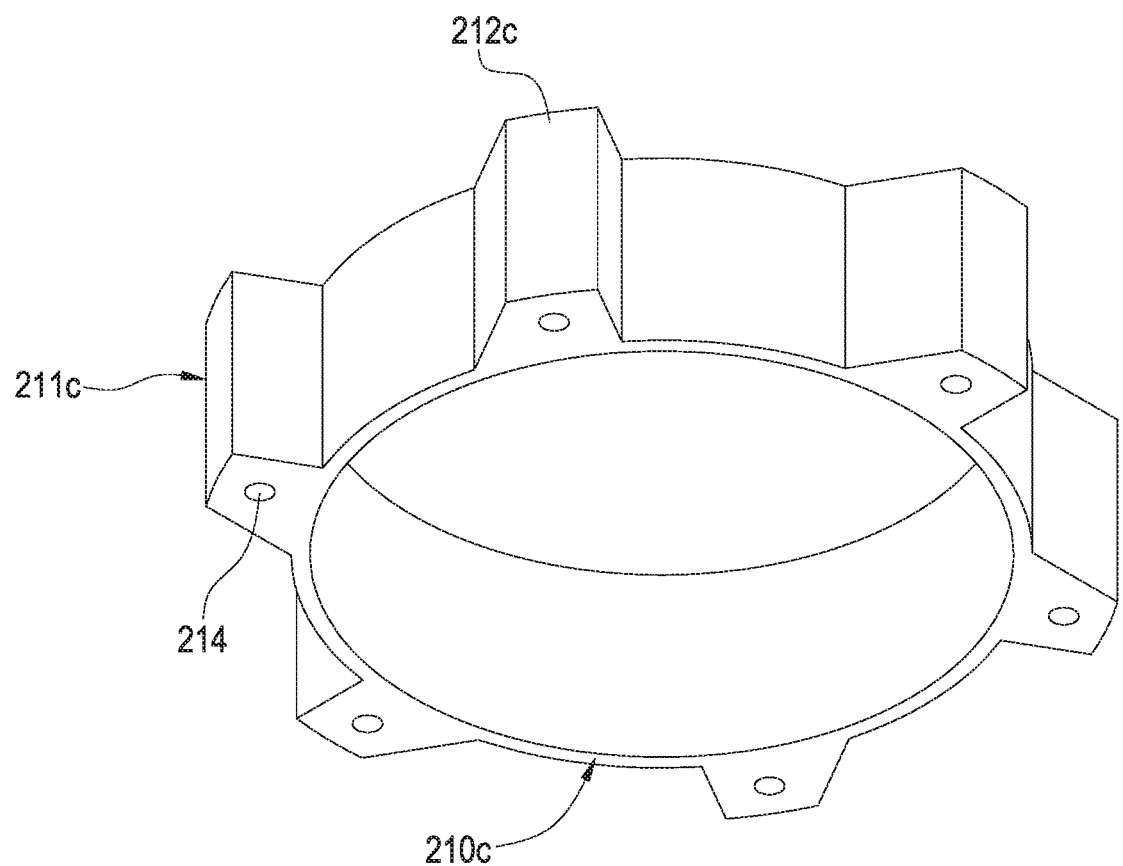
FIG. 12 is a perspective view of a connecting structure of the fourth exemplary embodiment of a fan rotor of this disclosure.

With reference to FIGS. 10 to 12 for the fourth exemplary embodiment of a fan rotor of this disclosure, the fan rotor comprises a metal body 100 and a vane wheel 200c. The structure of the metal body 100 of this exemplary embodiment is the same as that of the first exemplary embodiment and thus will not be repeated.

The vane wheel 200c includes a connecting structure 210c and a vane unit 230. In this exemplary embodiment, the connecting structure 210c has a plurality of connecting units 211c formed and protruded from an outer surface of the connecting structure 210c, and each connecting unit includes a connecting pillar 212c, and each connecting pillar 212c is parallel to the axis of the connecting structure 210c, and an end of each connecting pillar 212c is locked to the connecting portion 140. The connecting pillars 212c are configured to be corresponsive to the first locking holes 141 respectively, and each connecting pillar 212c has a second locking hole 214 penetrating through both ends of the connecting pillar 212c along the longitudinal direction of the connecting pillar 212c. The connecting structure 210c is sheathed on the metal body 100, and an end of the connecting structure 210c is locked to the connecting portion 140, and the connecting structure has a length shorter than the metal body, so that the connecting structure surrounds a portion of the lateral side of the metal body, and the vane unit 230 is locked to the other end of the connecting structure 210c.

In this exemplary embodiment, the vane unit 230 includes a chassis 231, a socket 232 formed on the chassis 231, a plurality of third locking holes 233 formed on the chassis 231, configured to be corresponsive to the second locking holes 214 respectively, and arranged around the socket 232. The chassis 231 has a plurality of centrifugal blades 234 disposed thereon and arranged around the socket 232 substantially in a radial shape.

The vane wheel 200c is sheathed on the metal body 100 through the socket 232, so that the centrifugal blades 234 are arranged around the metal body 100. An end of the second locking hole 214 is locked to the corresponsive first locking hole 141 of the connecting portion 140 by a screw 10, and the other end of the second locking hole 214 is locked to the corresponsive third locking hole 233 by a screw 10, so that the vane wheel 200c is locked to the connecting portion 140. The fan rotor is pivoted to a stator seat (not shown in the figure) through the rotating shaft 110 and rotatable with respect to the stator seat, so that the centrifugal blades 234 can rotate with respect to the rotating shaft 110.

Figure 13:
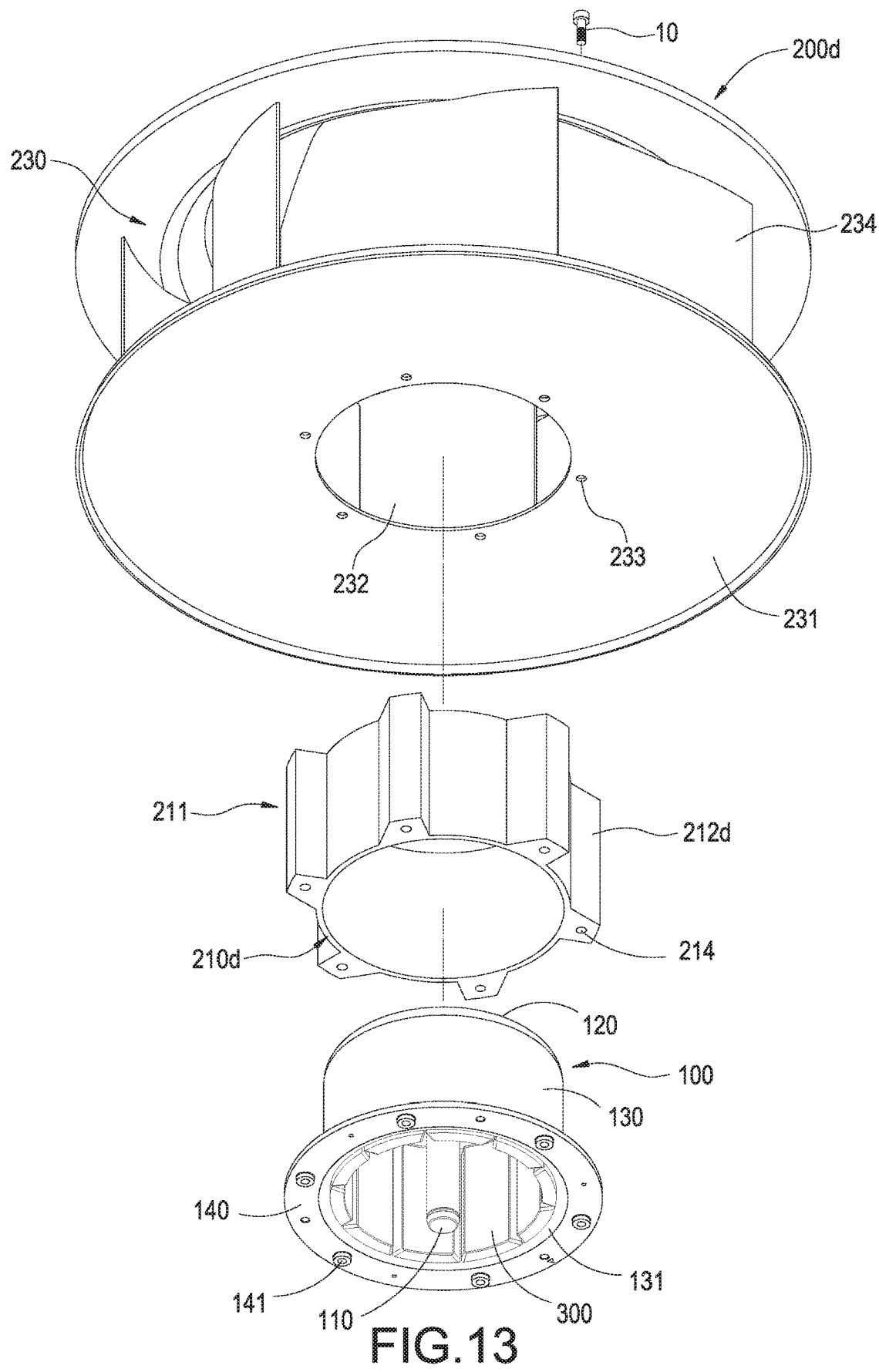
FIG. 13 is an exploded view of a fifth exemplary embodiment of a fan rotor of this disclosure.
Figure 14:
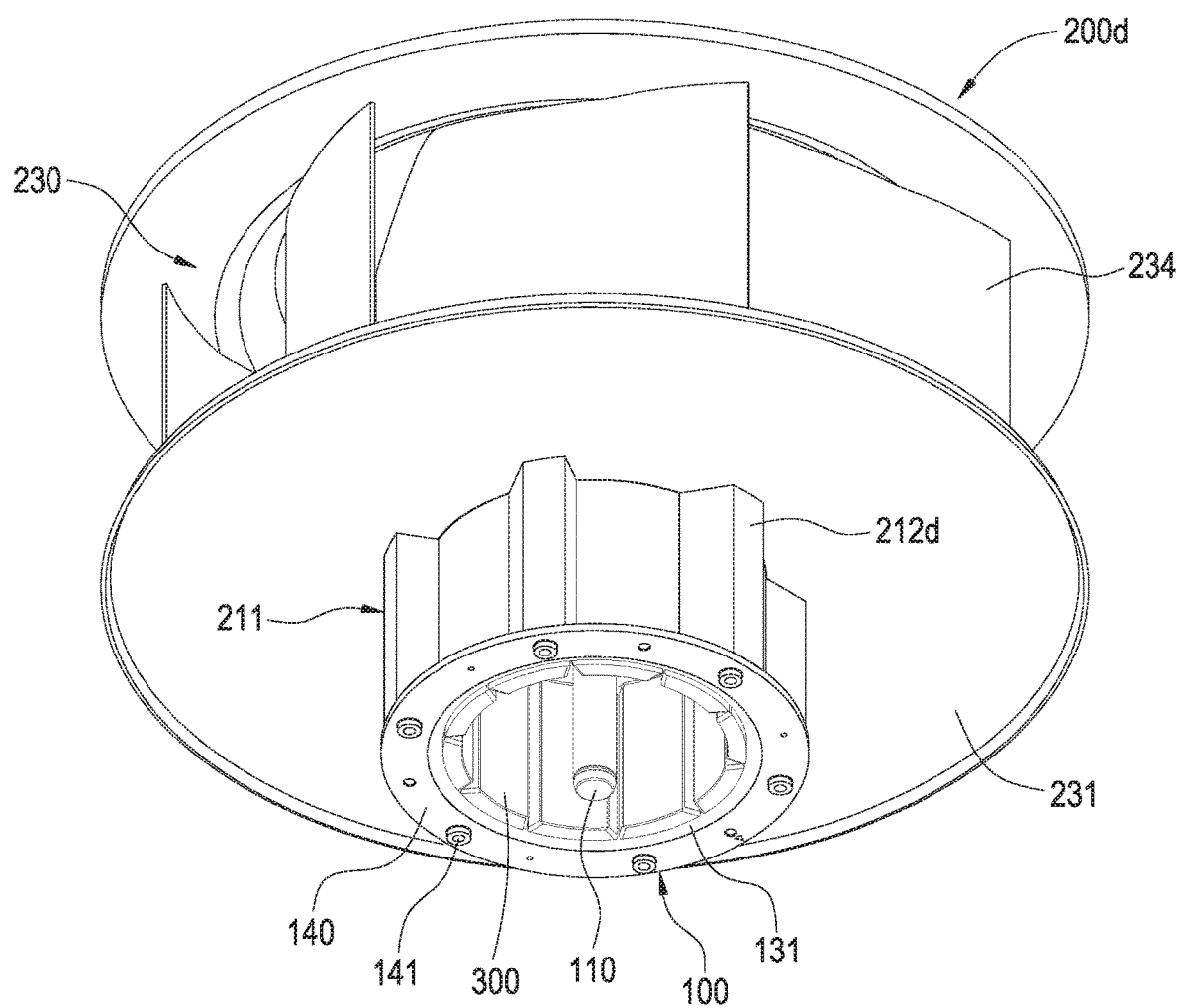
FIG. 14 is a perspective view of the fifth exemplary embodiment of a fan rotor of this disclosure.
Figure 15:
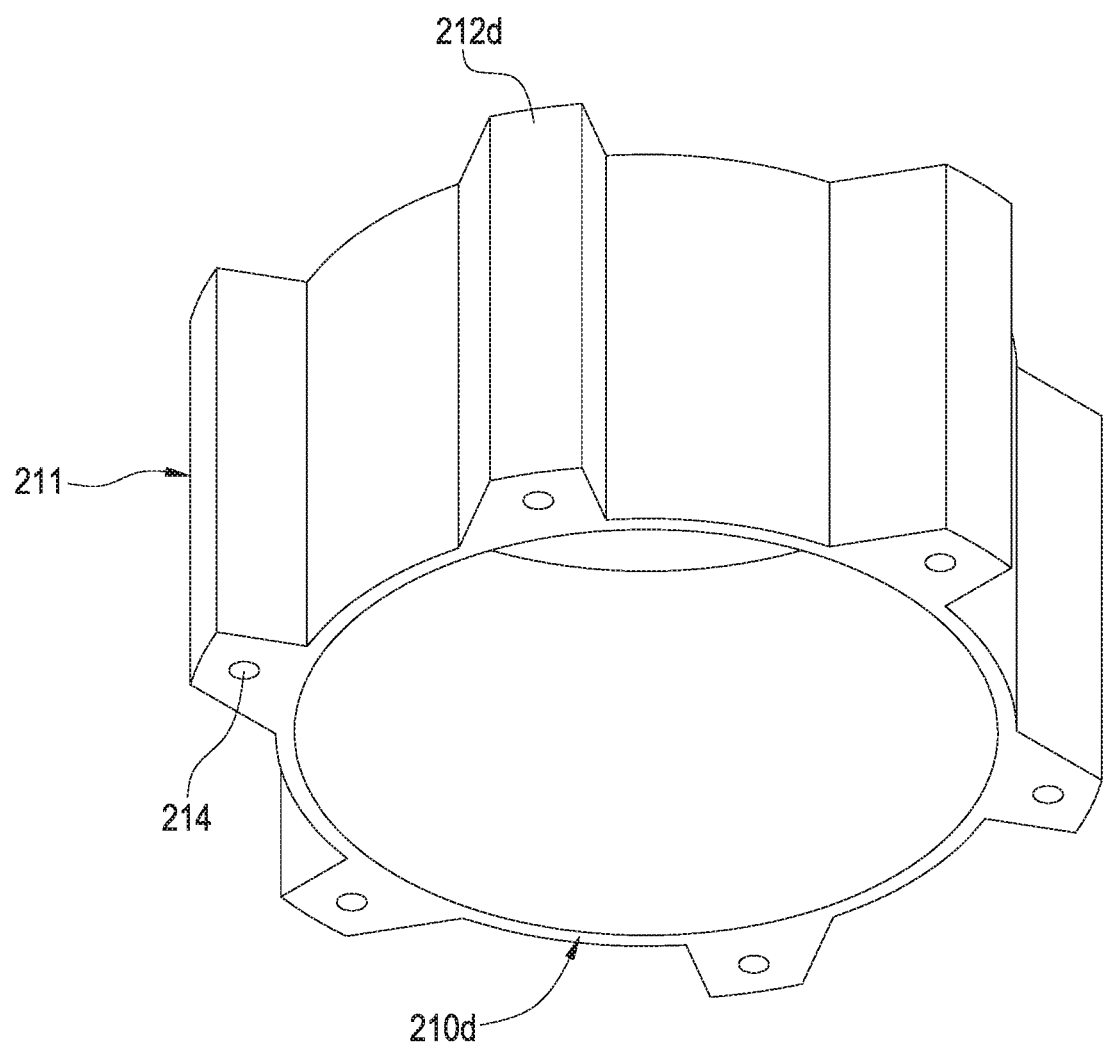
FIG. 15 is a perspective view of a connecting structure of the fifth exemplary embodiment of a fan rotor of this disclosure.

With reference to FIGS. 13 to 15 for the fifth exemplary embodiment of a fan rotor of this disclosure, the fan rotor comprises a metal body 100 and a vane wheel 200d. The structure of the metal body 100 is the same as that of the first exemplary embodiment, and thus will not be repeated.

The vane wheel 200d includes a connecting structure 210d and a vane unit 230. The structure of the connecting structure 210d is substantially the same as that of the fourth exemplary embodiment, except that the connecting structure 210d and the connecting pillar 212d have a length substantially equal to the length of the metal body 100. The connecting structure 210d is sheathed on the metal body 100, and the connecting structure surrounds the lateral side of the metal body 100 completely, or the connecting structure is higher than the top surface 120 of the metal body 100. An end of the connecting structure 210d is locked to the connecting portion 140, and the vane unit 230 is locked to the connecting structure 210d.

In this exemplary embodiment, the vane unit 230 includes a chassis 231, a plurality of third locking holes 233 formed on the chassis 231 and corresponsive to the second locking holes 214 respectively, and the third locking holes 233 are configured to be corresponsive to the first locking holes 141 and arranged substantially in a radial shape. The chassis 231 includes a plurality of centrifugal blades 234 disposed thereon and arranged substantially in a radial shape.

An end of the second locking hole 214 is locked to the corresponsive first locking hole 141 of the connecting portion 140 by a screw 10, and the other end of the second locking hole 214 is locked to the corresponsive third locking hole 233 by a screw 10, so that the vane wheel 200d is locked to the connecting portion 140, and the extending line of the rotating shaft 110 passes through the radiating center of the centrifugal blade 234. The fan rotor is pivoted to a stator seat (not shown in the figure) through the rotating shaft 110 and rotatable with respect to the stator seat, so that the centrifugal blades 234 can rotate with respect to the rotating shaft 110.

Figure 16:
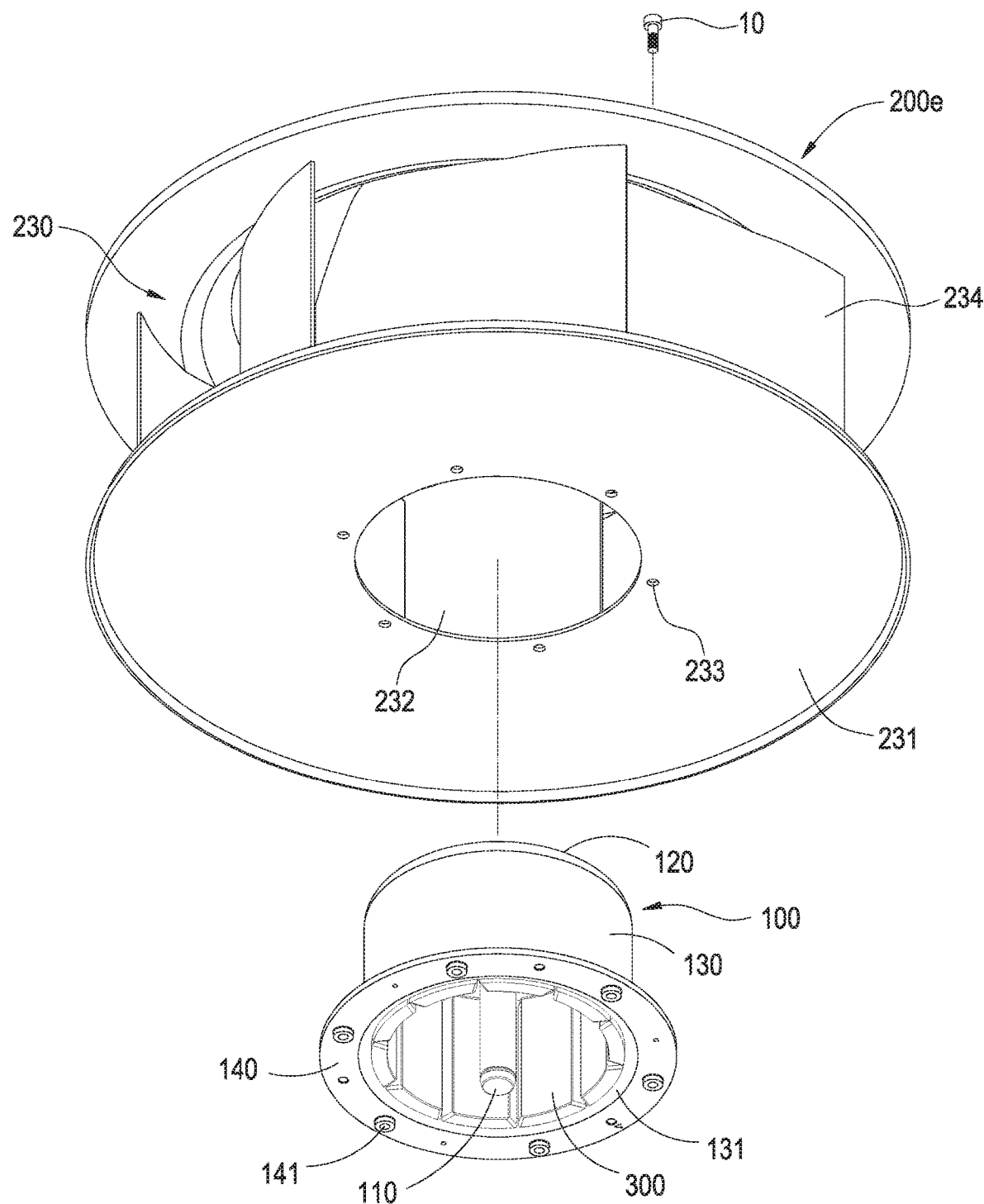
FIG. 16 is an exploded view of a sixth exemplary embodiment of a fan rotor of this disclosure.
Figure 17:
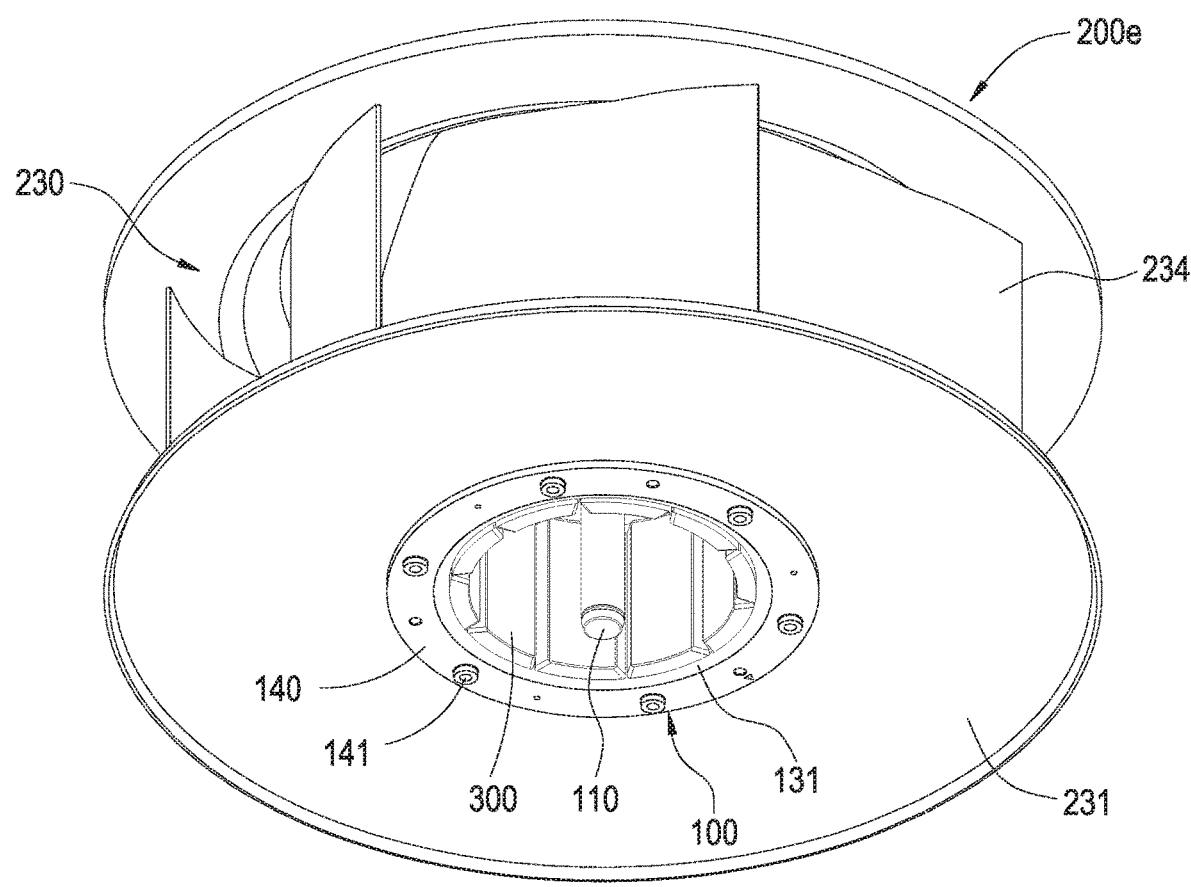
FIG. 17 is a perspective view of the sixth exemplary embodiment of a fan rotor of this disclosure.

With reference to FIGS. 16 and 17 for the sixth exemplary embodiment of a fan rotor of this disclosure, the fan rotor comprises a metal body 100 and a vane wheel 200e.

The metal body 100 has a rotating shaft 110 installed therein and along the axial direction in the metal body 100, an opening 131 formed on the metal body 100, and a connecting portion 140 integrally extended from the rim of the opening 131 along the radial direction of the metal body 100, and the connecting portion 140 has a plurality of first locking holes 141 formed thereon and arranged around the connecting portion 140.

The vane wheel 200d includes a vane unit 230, and the vane unit 230 includes a chassis 231, a socket 232 formed on the chassis 231, and a plurality of third locking holes 233 formed on the chassis 231 and corresponsive to the first locking holes 141 respectively and arranged around the socket 232. The chassis 231 has a plurality of centrifugal blades 234 disposed thereon and arranged around the socket 232 substantially in a radial shape, and the vane wheel 200e is sheathed on the metal body 100 through the socket 232, so that the centrifugal blades 234 are arranged around the metal body 100, and each first locking hole 141 is locked to the corresponsive third locking hole 233 by a screw 10, so that the vane wheel 200e is locked to the connecting portion 140. The fan rotor is pivoted to a stator seat (not shown in the figure) by the rotating shaft 110 and rotatable with respect to the stator seat, so that the centrifugal blades 234 can rotate with respect to the rotating shaft 110.

In this disclosure, the fan rotor and the vane wheel have the connecting structure 210 selectively locked to the vane unit 220 having the axial flow type blades 221 or the vane unit 230 having the centrifugal blades 234. In addition, the fan rotor of this disclosure may select the connecting structure with a different length according to actual using requirements, so that the installation position of the vane unit 230 having the centrifugal blades 234 may be adjusted according to the actual using requirements. In addition, the vane wheel may not come with the connecting structure according to the actual requirements, and the vane unit 230 having the centrifugal blades 234 may be locked to the connecting portion 140 directly. Therefore, the fan rotor of this disclosure can meet different using requirements. In addition, the metal body 100 and the connecting portion 140 are integrally formed, so that the gap between the outer wall of the metal body 100 and the inner wall of the connecting structure 210 can be reduced to minimize the vibration produced by the rotation of the vane wheel 200.

While this disclosure has been described by means of specific embodiments, numerous modifications and variations could be made thereto by those skilled in the art without departing from the scope and spirit of this disclosure set forth in the claims.

What is claimed is:

1. A fan motor, comprising:
   a metal body, including a rotating shaft, a cylindrical portion, a connecting portion, an opening, and at least one rotor magnet,
   wherein
   the rotating shaft is disposed in the cylindrical portion and connected to a top surface of the cylindrical portion;
   the top surface is disposed at an end of the cylindrical portion;
   the connecting portion is formed at another end of the cylindrical portion and extends radially from an outer wall of the opening towards a direction away from the rotating shaft;
   the at least one rotor magnet is installed around an inner wall surface of the cylindrical portion; and
   a vane wheel, including a connecting structure and a vane unit;
   wherein the connecting structure is cylindrical, the metal body is sheathed in the connecting structure, and the connecting structure is locked to the connecting portion;
the vane unit is locked to the connecting structure; and
the vane wheel is detachably connected to the metal body.

2. The fan motor according to claim 1, wherein the connecting structure has a plurality of connecting units formed on and protruded from an outer side of the connecting structure, and each connecting unit includes a connecting pillar extended in a direction parallel to an axis of the connecting structure.

3. The fan motor according to claim 2, wherein the connecting portion has a plurality of first locking holes arranged around the connecting portion, and each connecting pillar has a second locking hole penetrating through both ends of the connecting pillar along a longitudinal direction of the connecting pillar.

4. The fan motor according to claim 3, wherein an end of the each second locking hole is locked to a corresponsive first locking hole formed on the connecting portion by a screw.

5. The fan motor according to claim 3, wherein the vane unit includes a chassis, a socket and a plurality of third locking holes formed on the chassis and arranged around the socket.

6. The fan motor according to claim 5, wherein each third locking hole of the plurality of third locking holes respectively corresponds to a corresponding second locking hole.

7. The fan motor according to claim 5, wherein the vane unit includes a plurality of centrifugal blades disposed on the chassis and arranged around the socket.

8. The fan motor according to claim 2, wherein the connecting structure comprises at least one blade carrying portion extended from an end or an edge of each respective connecting pillar to connect the vane unit.

9. The fan motor according to claim 8, wherein the blade carrying portion is inclined with respect to the connecting pillar.

\* \* \* \* \*